US010661594B2

(12) United States Patent
Trexler et al.

(10) Patent No.: US 10,661,594 B2
(45) Date of Patent: May 26, 2020

(54) STRUCTURE FOR SECURE CONTAINMENT OF INFORMATION

(71) Applicants: Adam Trexler, Portland, OR (US); Laurie Johansen, Grants Pass, OR (US); Paul Diffendaffer, Grants Pass, OR (US); Kelda J. Diffendaffer, Grants Pass, OR (US)

(72) Inventors: Adam Trexler, Portland, OR (US); Laurie Johansen, Grants Pass, OR (US); Paul Diffendaffer, Grants Pass, OR (US); Kelda J. Diffendaffer, Grants Pass, OR (US)

(*) Notice: Subject to any disclaimer, the term of this patent is extended or adjusted under 35 U.S.C. 154(b) by 0 days.

(21) Appl. No.: 15/984,000

(22) Filed: May 18, 2018

(65) Prior Publication Data
US 2019/0351694 A1 Nov. 21, 2019

(51) Int. Cl.
*G06K 19/00* (2006.01)
*B42D 25/45* (2014.01)
(Continued)

(52) U.S. Cl.
CPC .............. *B42D 25/45* (2014.10); *B32B 15/08* (2013.01); *B42D 25/369* (2014.10); *B42D 25/373* (2014.10); *B42D 25/378* (2014.10); *B42D 25/465* (2014.10); *G06K 19/041* (2013.01); *H04L 9/3226* (2013.01); *B32B 2250/05* (2013.01); *B32B 2255/10* (2013.01); *B32B 2255/205* (2013.01); *B32B 2307/412* (2013.01); *B32B 2425/00* (2013.01); *B42D 25/328* (2014.10); *B42D 25/355* (2014.10)

(58) Field of Classification Search
CPC ...... G06K 19/083; G06K 13/07; G06F 21/34; G06Q 10/0833; B42D 15/025; A63F 3/0655
USPC .................................................. 235/487, 488
See application file for complete search history.

(56) References Cited

U.S. PATENT DOCUMENTS 6,199,757 B1 * 3/2001 Kubert .................... G06K 13/07
  235/375
7,059,514 B1 * 6/2006 Peters .................... A63F 3/0665
  235/375

(Continued)

FOREIGN PATENT DOCUMENTS

KR  20160050876  5/2016

*Primary Examiner* — Daniel A Hess
(74) *Attorney, Agent, or Firm* — Kilpatrick Townsend & Stockton LLP

(57) ABSTRACT

A structure for secure containment of information (SSCI) that is in the form of a laminate which includes at least two layers. The laminate is constructed to contain information such as a code, serial number, informational feature, encryption key or personal identification number (PIN). The information is located between the layer of the laminate such that the code, serial number, informational feature, encryption key, or PIN is not detectable from outside the laminate. The SSCI is configured to provide access and expose the code, serial number, informational feature, encryption key, or PIN by delaminating at least one layer, thereby indicating that tampering has occurred to the laminate. The SSCI can also function as a public key or private key for a blockchain, to provide access to a physical lock or to provide account access to claim financial value.

24 Claims, 1 Drawing Sheet

(51) Int. Cl.
  *G06K 19/04*  (2006.01)
  *B42D 25/373*  (2014.01)
  *B42D 25/465*  (2014.01)
  *B42D 25/369*  (2014.01)
  *B42D 25/378*  (2014.01)
  *B32B 15/08*  (2006.01)
  *H04L 9/32*  (2006.01)
  *B42D 25/355*  (2014.01)
  *B42D 25/328*  (2014.01)

(56) References Cited

U.S. PATENT DOCUMENTS

| | | | | |
|---|---|---|---|---|
| 2002/0162895 | A1* | 11/2002 | Neto | G06F 21/34 235/494 |
| 2004/0227000 | A1* | 11/2004 | Behm | A23J 1/14 235/487 |
| 2012/0138688 | A1* | 6/2012 | Young | A63F 3/0655 235/488 |
| 2012/0193432 | A1* | 8/2012 | Biskupski | B42D 15/025 235/488 |
| 2012/0256003 | A1* | 10/2012 | Boge | G06K 19/083 235/488 |
| 2015/0169906 | A1* | 6/2015 | Weintraub | G06Q 10/0833 235/375 |
| 2016/0358420 | A1 | 12/2016 | McCullah | |
| 2016/0371679 | A1 | 12/2016 | Goto | |

* cited by examiner

STRUCTURE FOR SECURE CONTAINMENT OF INFORMATION

TECHNICAL FIELD

The invention generally pertains to secure storage of codes used in commerce, and more specifically to improved security features for a currency laminate which is not susceptible to external detection, tampering and/or counterfeiting.

BACKGROUND ART

In the world of currency and financial instruments various symbols of value are utilized to facilitate acquiring, owning and transferring financial value. Examples of physical representation of cryptocurrency products that store value include denarium, bitnote, Suisse polymerbit, and cassascius coins, and cryptocurrency wallets. One feature that all of these have in common is the inclusion of a security feature, which is in the form of information that is usually beneath either a holographic sticker or a scratch-off material. These stickers or scratch-off materials are intended to be removed and therefore are located on an easily-accessible exterior surface of the token.

There are problems associated with these conventional security features. One of the most serious of the problems is tampering. Holographic stickers can be quickly and easily removed by using a hypodermic syringe to inject solvent under the sticker. Once the sticker is removed, a person can view the information that is beneath the sticker and then re-attach the sticker, usually with little to no indication that any tampering has occurred. Scratch-off materials are also similarly prone to tampering and/or counterfeiting. Furthermore, the hidden information below stickers or scratch off materials may be revealed by techniques such as x-ray. NMR, or electromagnetic or thermal analysis. Similarly, codes on separate pieces of paper inside of a protective envelope can be revealed by de-lamination of the envelope, and even replaced with false codes and then re-laminated without detection.

For bills, a sticker is deeply flawed for counting and sorting machines because it could come off rendering the bill compromised. Similarly, scratch-off material cannot be handled very much without being compromised.

Another important distinction is that a sticker or scratch-off material makes the financial note essentially disposable. Makers of these products advise that a currency coin or bill could be compromised in any transaction and advise people to return the code to the blockchain as soon as they receive it, and to buy a new coin or bill if they want it in that form. This is a clear acknowledgement that the secure storage of the information in the currency instrument is not considered trustworthy. This disposability is a serious disadvantage and a cost, effectively making the bill or coin a one-exchange item.

A search of the prior art did not disclose any literature or patents that read directly on the claims of the instant invention. However, the following U.A. patents are considered related:

| PAT. NO. | INVENTOR | ISSUED |
| --- | --- | --- |
| KR20160050876 | Kyun | Oct. 31, 2014 |
| 2016/0371679 | Goto | Dec. 22, 2016 |
| 2016/358420 | McCullah | Dec. 8, 2016 |

The KR2016/0050876 publication discloses a bitcoin trading method capable of reinforcing security by storing a private key and a public key of a dealer which are necessary for bitcoin trading in a smart card held by the dealer and which is not in a web. The invention relates to using a public key and a private key stored in a smart card. The bitcoin trading method comprises: storing a pair of authentication keys including a public key and a private key of a dealer issued from a bitcoin trading management server in a smart card of the dealer, inputting bitcoin trading information including a public key of a trade partner in a trading terminal; transmitting the private key of the dealer stored in the smart card to the trading terminal; encrypting the bitcoin trading information with the private key of the dealer received from the smart card by the trading terminal, and by the bitcoin trading management server. According to the present invention, the bitcoin trading method may reinforce security by storing a private key and a public key of a dealer which are necessary for bitcoin trading and many use the existing infrastructure without investing additional costs.

The 2016/0371679 publication discloses a method of conducting a virtual currency transaction through payment cards. The method comprises steps of a payer providing a payment card with an encrypted address; associating the encrypted address to at least one virtual wallet having currencies; a payee receiving a predetermined amount of currencies from the virtual wallet by scanning the encrypted address; and the payee depositing the currencies into payee's virtual wallet.

The 2016/358420 publication discloses a method wherein an in-game currency (including digital or currency) or in-game resource is backed by or designated to represent a real world currency or a real world physical object. The in-game currency or in-game resource is backed with real currency, digital currency or a physical object using a percentage of the revenues from in-game purchases, game subscriptions or in-game advertising.

DISCLOSURE OF THE INVENTION

A structure for secure containment of information (SSCI) that provides a significant improvement to the security and convenience of blockchain and other types of currency. In currency art, most currency coins and bills utilize either a holographic sticker or a scratch-off material on the surface, both of which are designed to be removable and are therefore not located within the structure of the coin or bill. For one type of physical bitcoin, a private key is printed on a piece of plastic with a scratch-off layer. The bitcoin is then placed inside an envelope made of layers of metal foil and plastic-paper polymer. The SSCI instead utilizes layers as an integral element of the instantiated information in the laminate and does not use a scratch-off layer or envelope. The SSCI also does not have a separate piece of plastic inside a laminate, unlike some other designs which are effectively just an envelope for code written on a separate piece of material.

Scratch-off material can also be tampered with and/or counterfeited. Holograms, or other sticker type items can be easily removed, thus exposing the information beneath the sticker, and then re-attached. An alternative for tampering would be to reattach a similar sticker. In both cases, the security of the product hinges upon one anti-counterfeiting feature. In contrast, the SSCI allows multiple anti-counterfeiting features to be broken in the process of delamination.

Another form of information concealment, which may be called a "window", is used in sending pin codes and other information. The code is printed on a first sheet of paper or plastic, and then a second sheet of paper, plastic or foil is attached to cover the code, with the adhesive in a rectangle or circle all around the code, but not on the code itself. In another related version, a window is made such that the sheet may be torn open to reveal the code on the first sheet. The tamper proofing in this case is based on the tearing of the second sheet to expose the code on the first sheet. In essence, the window is an envelope that is sealed on its edges and may be opened to reveal information.

There are several substantial differences between a window and the more secure SSCI:

1) In a window, there is no adhesion over the code itself. In the SSCI, adhesion is effected across the surface of the underlying sheet(s), and adhesion in some versions instantiates the code. The code is integrated into the structure which makes it harder to reveal covertly, and more difficult to overcome the security features.
2) It is easier to delaminate an edge of a window, and it is harder to detect such tampering, than to delaminate the entire laminate as in this invention. In instances of this invention where the adhesive itself creates a readable surface after delamination, tampering is further discouraged because the code is essentially not readable until irreversible delamination has occurred.
3) The need for a window to be readily tearable introduces structural weakness into the form. In the SSCI, both outer layers may be chosen for optimal strength and resistance to tearing.
4) The two sheets that form a window are not intrinsically resistant to tampering. An attack on the adhesive connecting the two sheets is possible. In the SSCI the only way to open the product is to delaminate the sheets, materially and visually changing the appearance of the layers.
5) In the window, anti-tampering features can only be relevantly applied to the window itself; or perhaps to the code beneath the window. In the SSCI, delamination would substantially break numerous anti-tamper and security features over a wider area. This invention is far more difficult to counterfeit or defeat than the existing window devices.
6) The window is essentially limited to one layer of material information. In the SSCI, multiple layers of information, as well as decoy layers, may be laminated together.

The instant SSCI addresses these issues by providing a structure that implements new and unique containment of information as well as a method for producing the containment of information.

The SSCI includes a laminate with at least two layers, which can be made of a variety of material, with plastic and/or metal preferred depending on the functional application. The SSCI is constructed to contain information including a code, serial number, information feature, encryption key or personal identification number (PIN number). The information is located between the layers such that the information is not visible or detectable from outside the laminate. To access and reveal the information within the laminate, the laminate is de-laminated, thereby indicting that tampering has occurred to the laminate. When the SSCI is de-laminated, irreversible damage is done to multiple metal and plastic layers, such as turning the metal layer into flakes or powder in a random or selected pattern, folds and creases to the bill, breaking of the print layers, breaking of security threads such as color-shift threads, oxidation of layers, separation of print layers onto distinct surfaces, intentional tearing of layers, changed color of adhesive, and demetalization of holograms, if they are included.

The information within the laminate is a pattern incorporated into at least one of the layers. There are multiple ways of instantiating the information into or onto the layer(s). Examples of instantiation include placing material on the layer(s), placing material on the layer(s) and removing some of the material, placing adhesive material on the layer(s), placing release material on the layer(s), or utilizing magnetic domains.

At least one of the layers can also retain a pattern of electrically charged material or contain a pattern of chemically altered material with the pattern exhibiting the information. Additionally, at least one of the layers can contain information that is displayed as at least two visible colors, which are comprised of colored materials that have similar chemical structures.

The information within the laminate may provide access to open a lock, typically by means of an electronic device. The information may also provide account access to claim financial value, or to function as a private key for a blockchain. The laminate can utilize at least one blocking layer that restricts radiation and other interrogation methods.

One example of the SSCI structure is a five-layer design with the layers comprising in order: a first plastic layer that is transparent and includes indicia, a first layer of metal, a patterned adhesive material with areas of low adhesion, a second layer of metal, and a second transparent plastic layer. The method of assembling the SSCI comprises the first metal layer is vacuum deposited on the first plastic layer, the second metal layer is vacuum deposited on the second plastic layer, patterned release material is applied to the laminating adhesive and the thus patterned laminating adhesive applied between the two metal layers, with the metal surfaces of the first and second metal layers in contact with the patterned adhesive, thereby leaving the plastic surfaces of the two plastic and metal laminated layers exposed.

In view of the above disclosure the primary object of the invention is to provide a structure for secure containment of information that includes improved security features for currency, financial devices or other information devices.

In addition to the primary object, it is also an object of the invention to provide a structure for secure containment of information that:
- can be used for many types of currency,
- can be used for non-currency applications,
- is easy to implement,
- can be visually attractive and informative,
- does not interfere with the use of currency,
- can utilize a variety of security features,
- is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is disclosed in terms that disclose a preferred embodiment with multiple structural configurations and methods for manufacture of a structure for secure containment of information (SSCI 10). In many types of currency, and in particular blockchains, security features are placed on bills or coins. Examples of security features are a holographic sticker and a scratch-off material. Other security features, such as security printing, serial numbers, color shift thread, etc. might be printed on the surface of the bill, but are not affected by tampering or legitimate removal of the hologram sticker or scratch-off material. These, and other, security features are utilized to cover or otherwise mask information located beneath a sticker or scratch-off material.

A problem exists in that these external security features are susceptible to tampering and counterfeiting. It is not difficult to use a hypodermic syringe to inject a solvent under a sticker, remove the sticker to expose the information, and then to replace the sticker. This just one example. Some stickers can simply be peeled off and then replaced without any noticeable indication. Still other stickers may be heated, breaking the adhesive bond, and then reattached without damaging the sticker substrate. Scratch-off material is also at risk of tampering and counterfeiting. The SSCI 10 addresses these problems by providing an effective solution of embedding a private code or key within a currency bill, rather than on an exterior surface. The SSCI's 10 construction is designed for hiding codes, keys or other information instead of utilizing an add-on item to the exterior surface or packaging of an enclosed separate item.

Figure 1:
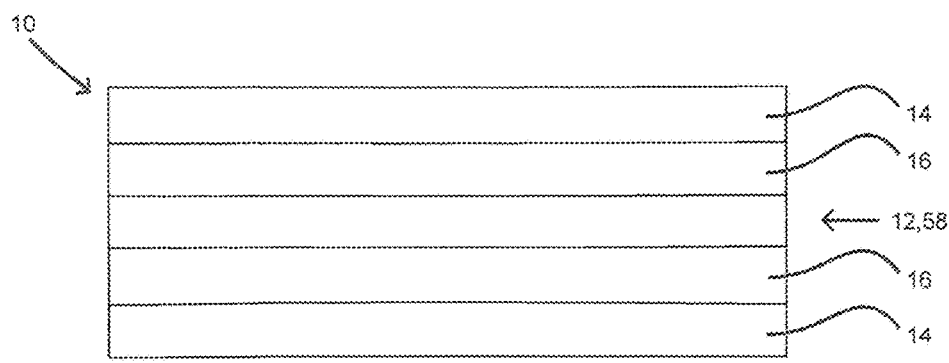
FIG. 1 is an elevational side view of a five-layer design of a structure for secure containment of information.
Figure 2:
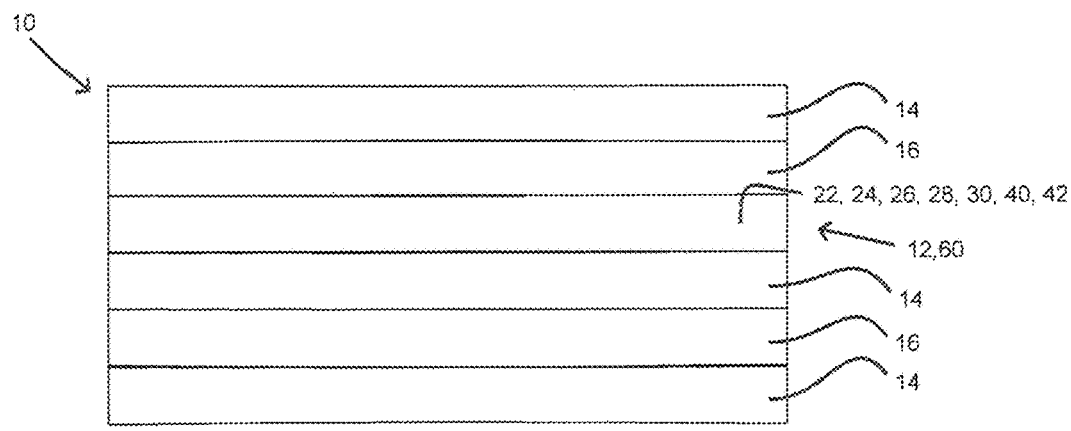
FIG. 2 is an elevational side view of a six-layer design of the structure for secure containment of information.
Figure 3:
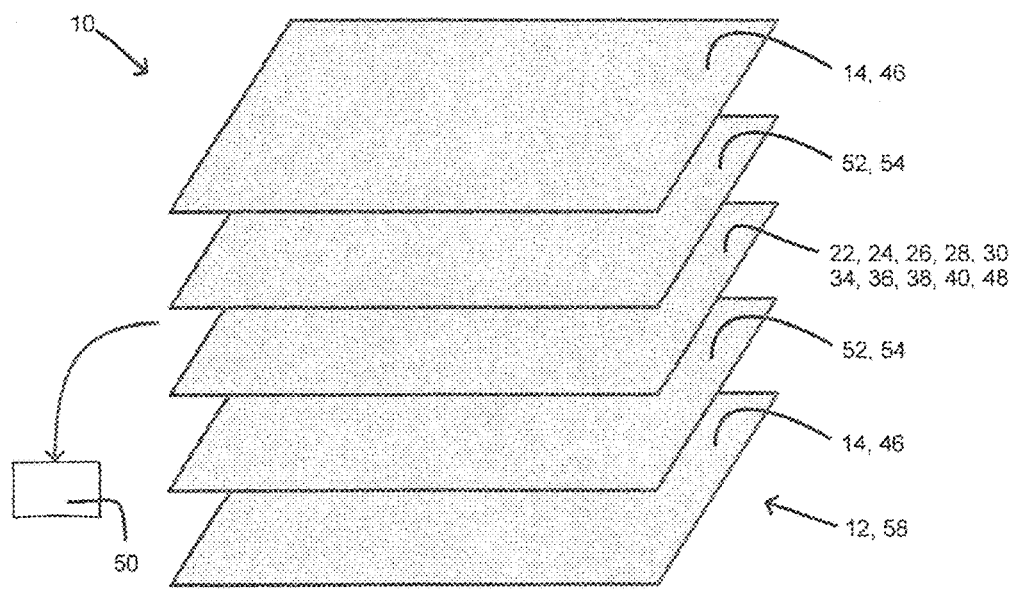
FIG. 3 is an exploded view of the five-layer design of the structure for secure containment of information.

As shown in FIGS. 1-3, the SSCI 10 is comprised of a laminate 12 having at least one plastic layer 14 and at least one metal layer 16. Preferably, there are multiple plastic and metal layers comprising the laminate 12. While plastic and metal are the two most effective materials for the layers, other material such as glass, ceramic, paper or sheets of fibrous material can also be utilized. The laminate 12 is constructed to contain information 22 including a code, serial number, informational feature, encryption key or pin number. The information 22 is located between the laminate layer such that the code, serial number, informational feature, encryption key or pin number is not visible from outside the laminate. To access and expose the information 22, the laminate 12 is delaminated, thereby indicating that tampering has occurred to the laminate 12.

The information 22 is preferably a physical pattern 24, as shown in FIGS. 2 and 3, that is instantiated into at least one of the layers 14,16. There are multiple ways of instantiating the information into the layer(s), including but not limited to: placing material 26 on the layer and then removing material 26 from the layer such that the remaining material 26 exhibits the information 22, placing material 26 on the layer such that the material 26 exhibits the information 22, placing adhesive 28 material on the layer such that the adhesive 28 material exhibits the information 22, or placing release material 30 on the layer such that the release material 30 exhibits the information 22.

At least one of the layers 14,16 can contain information 22 instantiated by magnetic domains 34, as shown in FIG. 3. Also, at least one of the layers 14,16 can retain a pattern of electrically charged material 36, and/or contain a pattern of chemically altered material 38, as also shown in FIG. 3. The information 22 can be displayed as at least two visible colors which are comprised of colored material(s) 42, as shown in FIG. 2, that have similar chemical structures. At least one of the colored materials 42 laterally surrounds the other colored material 42.

The code, serial number, informational feature, encryption key or pin number provides access to open a physical or an informational lock. The access is provided by a device such as a computer, scanning device, wireless phone, wireless device, digital watch, digital glasses or digital camera. Additionally, the code, serial number, informational feature, encryption key or pin number provides account access to claim financial value, and/or provides access to a financial account 50 such as a physical commodity, a bank account or a brokerage account. It should be noted that exposing the code, serial number, informational feature, encryption key or pin number can constitute the execution of a contract.

To increase the functionality and security capabilities of the SSCI 10, the plastic layer(s) 14 can include at least one decoy layer 52, as shown in FIG. 3, which contains patterns that do not exhibit the information 22. The code, serial number, informational feature, encryption key, or pin number can be utilized as a public key 46, as shown in FIG. 3, or a private key 48, as also shown in FIG. 3, or to value stored in a blockchain. The SSCI 10 can also include at least one blocking layer 54, as shown in FIG. 3, that restricts radiation and other interrogation methods. The blocking layer 54 can be made of a material including a metal, an ink, a dye or a pigment. When a pigment is used, the pigment may be comprised of carbon.

The SSCI 10 can consist of various structure designs and the method can include steps for producing a structure having multiple layers. A five-layer design 58, as shown in FIGS. 1 and 3, has layers comprising in order: a first plastic layer 14 that is transparent and includes indicia, a first layer of metal 16, a layer of patterned adhesive material 40, as shown in FIG. 2, with areas of low adhesion, a second layer of metal, and a second transparent plastic layer. The method of assembling the SSCI 10 comprises: the first metal layer is vacuum deposited on the first plastic layer, the second metal layer is vacuum deposited on the second plastic layer, patterned release material is applied to laminating adhesive and the thus patterned laminating adhesive is applied between the two metal layers with the metal surfaces of the first and second metal layers in contact with the patterned adhesive, thereby leaving the plastic surfaces of the two plastic and metal laminated layers exposed.

A six-layer design 60, as shown in FIG. 2, has layers comprising in order: a first plastic layer 14 that is transparent and includes indicia, a first layer of metal 16, a printed layer of plastic 14, an applied release material layer 30, a second layer of metal 16, and a second transparent plastic layer 14. The method of assembling the SSCI 10 comprises: the first metal layer is vacuum deposited on the first plastic layer, the second metal layer is vacuum deposited on the second plastic layer, areas of release material are applied to the printed plastic layer, the printed plastic layer with the release material is laminated between the two metal layers with the metal surfaces of the first and second metal layers in contact with the printed plastic layer, thereby leaving the plastic surfaces of the two plastic and metal laminated layers exposed.

In the case of a metallic version of the SSCI 10, the center section could be made as a three-dimensionally structured metallic film with the deposition performed such that only metal rather than printing would be visible.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A structure for secure containment of information (SSCI), the structure comprising a laminate with at least three layers and the laminate constructed to contain information integrated into the structure, the information comprising one or more selected from a group consisting of a code, serial number, informational feature, encryption key and personal identification number (PIN), the information being located between the layers such that the information is not detectable from outside the laminate, the SSCI configured to provide access and expose the information by irreversible separation of at least two layers from each other, the separation process designed to also irreversibly damage layers on either side of the information indicating that tampering has occurred to the laminate.

2. The structure of claim 1 wherein the layers comprise a material selected from the group consisting of plastic, metal, glass, ceramic, paper and sheets of fibrous material.

3. The structure of claim 1 wherein the information comprises a physical pattern instantiated into at least one of the layers.

4. The structure of claim 3 wherein at least one of the layers contains the information, wherein the information is instantiated by placing material on the layer and then removing material from the layer such that the remaining material exhibits the information.

5. The structure of claim 3 wherein at least one of the layers contains the information, wherein the information is instantiated by placing material on the layer such that the material exhibits the information.

6. The structure of claim 3 wherein at least one of the layers contains the information, wherein the information is instantiated by placing adhesive material on the layer such that the adhesive material exhibits the information on the layer.

7. The structure of claim 3 wherein at least one of the layers contains the information, wherein the information is instantiated by placing release material on the layer such that the release material exhibits the information on the layer.

8. The structure of claim 3 wherein at least one of the layers contains the information, wherein the information is instantiated by magnetic domains.

9. The structure of claim 3 wherein at least one of the layers retains a pattern of electrically charged material.

10. The structure of claim 3 wherein at least one of the layers contains a pattern of chemically altered material, wherein the pattern exhibits the information.

11. The structure of claim 3 wherein at least one of the layers contains a layer of material comprising the information, wherein the information is displayed as at least two visible colors, wherein the visible colors comprise colored materials that have similar chemical structures, wherein at least one of the colored materials laterally surrounds the other colored material.

12. The structure of claim 1 wherein the information provides access to open a physical lock.

13. The structure of claim 1 wherein the information provides access by means of a device selected from the group consisting of a computer, scanning device, wireless phone, wireless device, digital watch, digital glasses, and digital camera.

14. The structure of claim 1 wherein the information provides account access to claim financial value.

15. The structure of claim 14 wherein the information provides access to a financial account selected from the group consisting of a physical commodity, a bank account, and a brokerage account.

16. The structure of claim 15 wherein the information comprises a public key for a blockchain.

17. The structure of claim 15 wherein the information comprises a private key for a blockchain.

18. The structure of claim 1 wherein any plastic layers of the SCIO further comprise at least one decoy layer which contains patterns that do not exhibit the information.

19. The structure of claim 1 wherein exposing the information constitutes execution of a contract.

20. The structure of claim 1 further comprising at least one blocking layer, wherein the at least one blocking layer restricts a radiation interrogation method.

21. The structure of claim 20 wherein the blocking layer is made of a material that is selected from the group consisting of a metal, an ink, a dye and a pigment.

22. The structure of claim 21 wherein the pigment comprises carbon.

23. A structure for secure containment of information (SSCI), the structure comprising a five-layer laminate comprising information that is not viewable from outside the laminate, the information comprising one or more selected from a group consisting of a code, serial number informational feature, encryption key and personal identification number (PIN), the five-layer laminate configured to provide access and expose the information by irreversible separation of layers from each other, the separation process designed to also irreversibly damage layers on either side of the information, indicating that tampering has occurred to the laminate, the five-layers including:
a first plastic layer that is transparent and includes indicia,
a first metal layer,
a patterned adhesive material layer with areas of low adhesion,
a second metal layer, and
a second transparent plastic layer, with the first metal layer vacuum deposited on the first plastic layer, the second metal layer vacuum deposited on the second transparent plastic layer, patterned release material layer applied to laminating adhesive and the laminating adhesive applied between the first and second metal layers with the metal surfaces of the first and second metal layers in contact with the adhesive material layer, thereby leaving the plastic surfaces of the two plastic and metal laminated layers exposed.

24. A structure for secure containment of information (SSCI), the structure comprising a six-layer laminate constructed to contain information that is not viewable from outside the laminate, the information comprising one or more selected from a group consisting of a code, serial number informational feature, encryption key and personal identification number (PIN), the laminate configured to provide access and expose the information by irreversible separation of layers from each other, the separation process designed to also irreversibly damage layers on either side of the information, indicating that tampering has occurred to the laminate, the six-layers including:
a first plastic layer that is transparent and includes indicia,
a first metal layer,
a printed plastic layer,
an applied release material layer,
a second metal layer, and
a second transparent plastic layer, with the first metal layer vacuum deposited on the first plastic layer, the second metal layer vacuum deposited on the second transparent plastic layer, a layer with areas of applied release material applied to the printed plastic layer, the printed plastic layer with the applied release material laminated between the first and second metal layers with the metal surfaces of the first and second metal layers in contact with the printed plastic layer, thereby leaving the plastic surfaces of the two plastic and metal laminated layers exposed.

* * * * *